Figure 3:
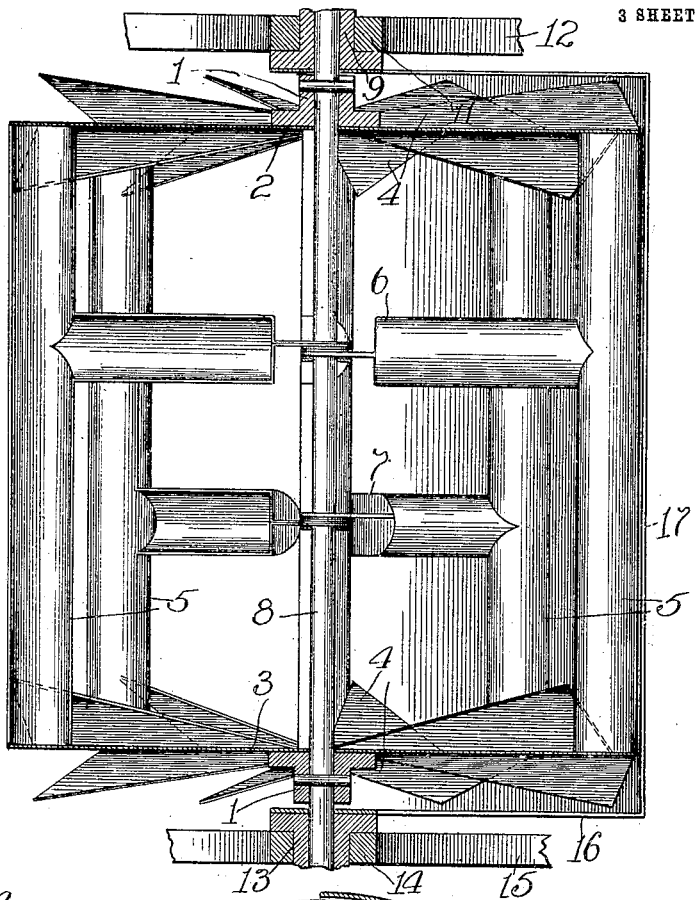
Figure 4:
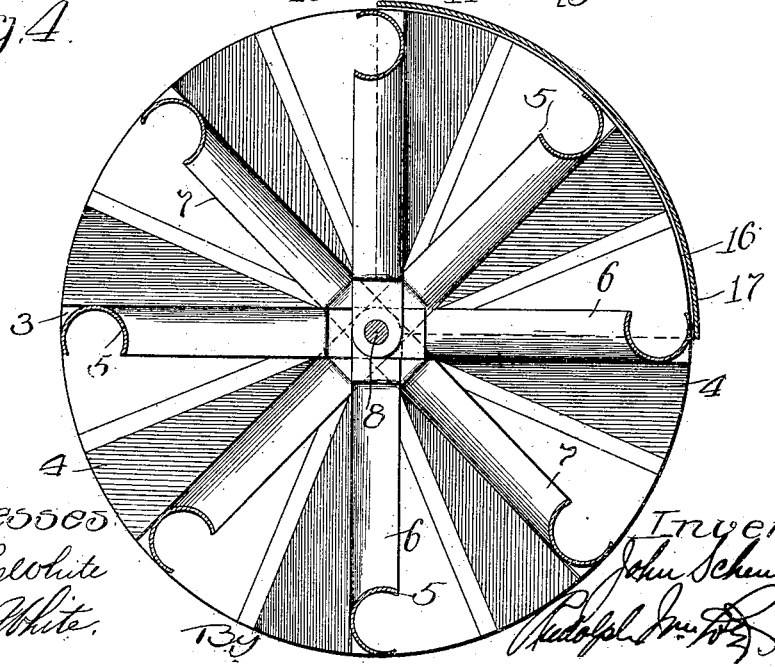

J. SCHEUBECK.
WIND MOTOR.
APPLICATION FILED FEB. 14, 1910.
979,098.
Patented Dec. 20, 1910.
3 SHEETS—SHEET 1.
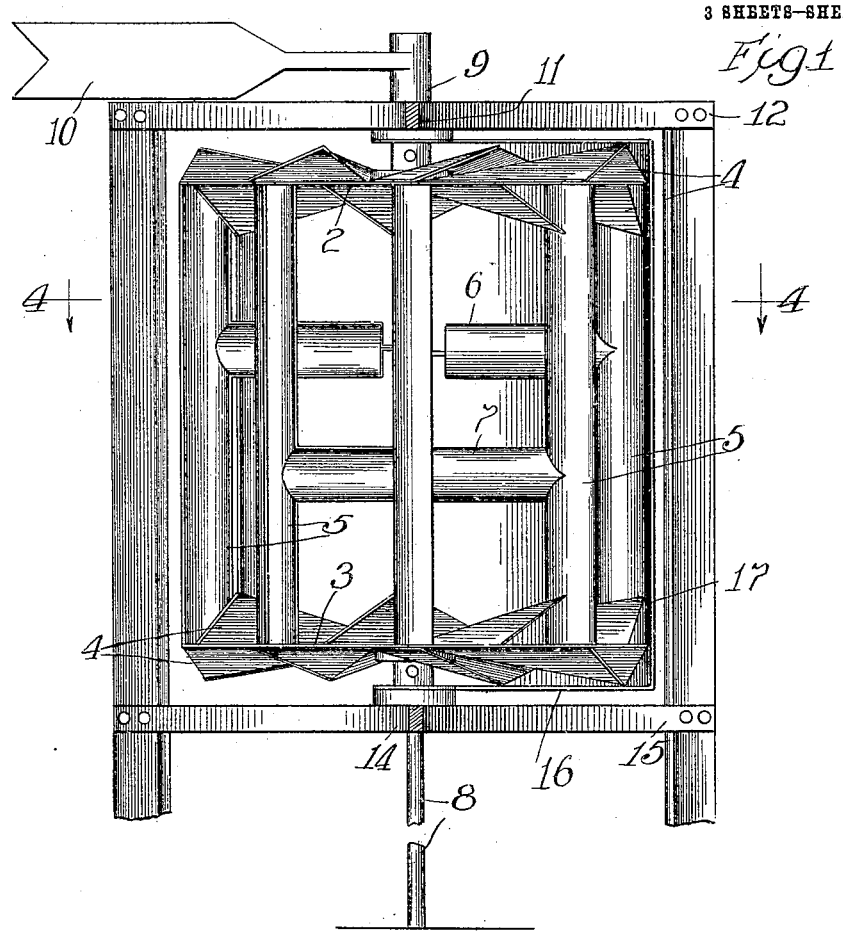
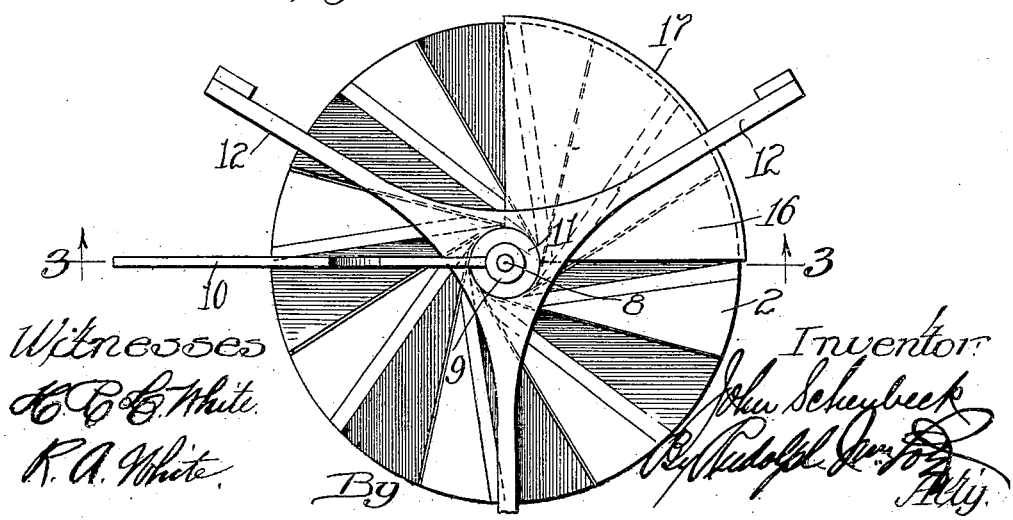

J. SCHEUBECK.
WIND MOTOR.
APPLICATION FILED FEB. 14, 1910.

979,098.

Patented Dec. 20, 1910.

3 SHEETS—SHEET 2.

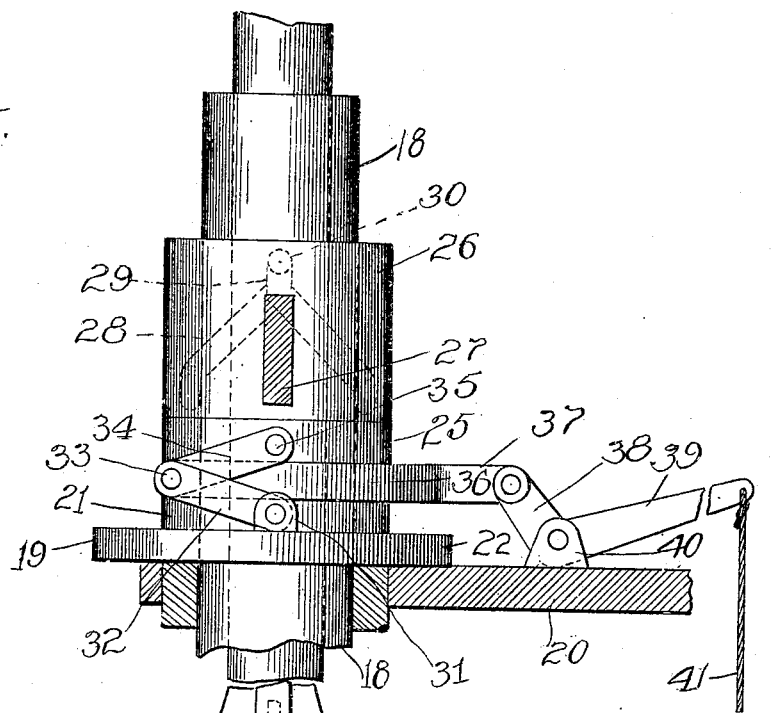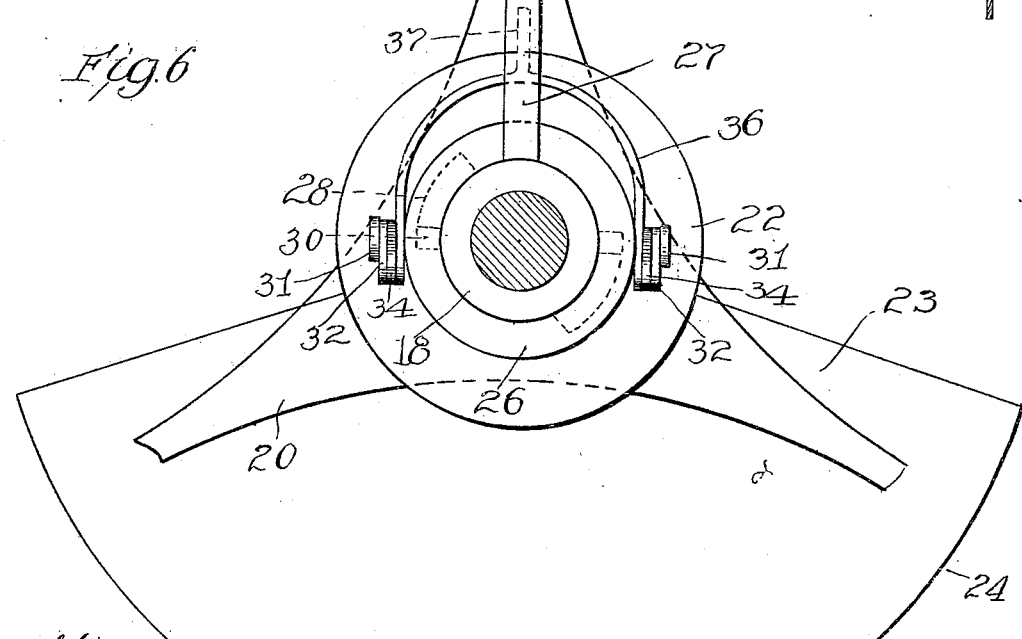

UNITED STATES PATENT OFFICE.

JOHN SCHEUBECK, OF CHICAGO, ILLINOIS.

WIND-MOTOR.

979,098.   Specification of Letters Patent.   Patented Dec. 20, 1910.

Application filed February 14, 1910.   Serial No. 543,842.

*To all whom it may concern:*

Be it known that I, JOHN SCHEUBECK, citizen of the United States, residing at Chicago, in the county of Cook and State of Illinois, have invented certain new and useful Improvements in Wind-Motors; and I do hereby declare the following to be a full, clear, and exact description of the invention, such as will enable others skilled in the art to which it appertains to make and use the same.

This invention relates to a novel construction in a wind motor, the object being to provide a device of this character which is simple and efficient, and offers relatively less surface to the weight and pressure relatively to its efficiency than the average motor of this character and which, furthermore, is directly mounted upon a vertical shaft so as to dispense with the gearing usually employed to transmit the motion from said wheel from the top to the bottom of its supporting tower.

The invention consists in the novel features of construction and combinations of parts hereinafter fully described and claimed.

In the accompanying drawings illustrating my invention: Figure —1— is a view in side elevation of a wind motor constructed in accordance with my invention, the supporting tower therefor being shown fragmentarily and partly broken away. Fig. —2— is a top plan view of the same. Fig. —3— is a central vertical section of the same on the line 3—3 of Fig. —2—, the vane carrying sleeve being broken away at its upper end. Fig. —4— is a plan section of the same on the line 4—4 of Fig. —3—. Fig. —5— is a fragmentary view, in side elevation on an enlarged scale showing means for setting the vane to prevent rotation of the wind wheel. Fig. —6— is a top plan view of the same.

My invention has for its particular object to provide a wind wheel in which the wind pressure surfaces are concave so as to catch and utilize to the greatest degree the wind pressures while at the same time the total area thereof is relatively smaller and permits of more open space for the passage of wind through the wheel, thereby reducing the strain on the tower.

A further object of the invention is to provide a wind wheel which is disposed directly upon a vertical shaft thus enabling a plurality of the same to be mounted on a single shaft and disposed at different elevations whereby air currents traveling at different elevations and sometimes in various directions may be utilized to impart power to a single shaft.

A further object of the invention is to provide a wind motor which is more durable and relatively more efficient than those ordinarily employed.

Referring to said drawings, 1, indicates the trunnions of the wind wheel which are rigidly mounted on the vertical shaft 8 and to which are rigidly secured top and bottom circular horizontal plates 2 and 3 respectively each of which is equipped on its upper and lower faces respectively, with triangular wings or flanges 4, the planes of which extend angularly to the planes of said plates and form angular wind pockets between the faces thereof opposed to the faces of the plates upon which they are mounted. All of said pockets open in the same direction and are adapted to catch the air currents or wind, and thus rotate said plates. Vertically disposed substantially trough-shaped members 5 are secured at their ends to said plates 2 and 3 respectively, adjacent the periphery of the latter and equidistantly from each other the concave face of each of said members 5 opposing the convex face of the next adjacent thereof. In the instance illustrated eight of said members 5 are shown and each thereof is connected with one end of a spoke 6 and 7 respectively, which is also trough-shaped and has its concave face disposed to face in the same direction as the concave face of the member 5 to which it is secured, the other end of each of said spokes being suitably connected and secured to said shaft 8. The hollows of said members 5 6 and 7 connect with each other so that when said spokes 6 are disposed at an obtuse angle to the direction of the wind, the air currents caught thereby will be deflected into said members 5 and by impinging against the outer portions radially of the wheel of said members 5 serve to exert pressure thereon tending to throw said members 5 out of the path of such currents. The members 6 and 7 are disposed at respectively different elevations and connect respectively with alternate members 5. The concave or hollow faces of said members 5, 6, and 7 open in the same direction as the pockets formed between the flanges 4 and the plates 2 and 3 so that each of said pockets and said concave faces of said members 5, 6 and 7 will, during their travel through a given arc, oppose the direction of the wind thus serving to catch the same and thus impart rotary movement to said wheel. The said trunnions 1 are keyed or otherwise rigidly mounted upon the vertical shaft 8 which is rotated thereby. Said shaft 8 is suitably disposed at its lower end in a step bearing of any suitable construction, such bearing being omitted from illustration as being superfluous. At its upper end said shaft is journaled in the sleeve 9 carrying the vane 10, such sleeve being suitably journaled in a bearing 11 carried by the spider 12, the respective radial arms of which are suitably secured to the uprights constituting the supporting tower. A similar sleeve 13 is journaled in a bearing 14 carried by a spider 15 disposed below said wheel and supported at the free ends of its arm upon the uprights of the tower. To said sleeves 11 and 13 segmental plates 16 are secured, each of the latter being substantially a quarter of a circle and secured to the peripheries of which is a vertical segmental plate 17 which constitutes a wind guard to deflect the wind from impingement against the convex faces of the members 5, 6 and 7 and the outer faces of the flanges 4 during the rotation of said respective members in a direction opposing the wind. The said vane 10 serves to maintain the said plate 17 always in proper position relatively to the direction of the wind to effect deflection of the latter as indicated above. It will be observed that any desired number of said members 4, 5, 6 and 7 may be employed and that the plates 2 and 3 may be made of any suitable diameter. Owing to the direct connection of said wheel (or a plurality thereof disposed at different elevations) with the vertical shaft to be rotated thereby, the friction incidental to the gearing usually required to transmit the motion of a wind wheel to a vertical shaft and the difficulties of maintaining such gearing in good operative condition and well lubricated, are entirely avoided besides enabling the entire structure to be more effectively braced and consequently made far more rigid than is ordinarily possible.

Power may be transmitted from the shaft 8 at the lower end thereof to drive any desired machinery and the utilization of such power may be controlled at will by clutches in any well known manner, such clutches being omitted from illustration as offering nothing novel in the art.

Owing to the fact that the wind pressure members of my said wheel are secured at both ends to members carried by the shaft, the danger of breakage or distortion during excessive wind storms is practically entirely obviated and owing to the amount of free space afforded for the passage of wind through the wheel, the total area presented to wind pressure is relatively smaller and affords less opportunity for distortion and breakage than is the case with the wind motors now generally employed.

In some localities it is desirable to throw the wind wheels entirely out of operation during certain intervals in order to obviate any noise made thereby or to protect the same from damage by very heavy winds or during snow and sleet storms. To this end I have devised means for deflecting the wind out of operative relation to the wind wheel shown in Figs. 5 and 6. Where this is to be accomplished it is preferable that the guard plate, partly inclosing the wheel and controlled by the vane 10, shall extend through an arc approximately 180 degrees, so that when disposed with its convex side facing the direction of the wind the latter will be unable to reach the wind pressure surfaces to rotate the wheel. In order to accomplish this it is necessary that the vane 10 shall be turned through an arc of approximately 90 degrees relatively to the sleeve or sleeves carrying the segmental plates on which said guard plate is supported. This I accomplish in the following manner: The sleeve 18 is journaled in the bearing 19 carried by the spider 20 disposed upon the uppermost end of the tower and is provided between its ends with an annular flange 21 resting upon the flange 22 of said bearing 19. The segmental plate 23, to which the guard 24, is secured, is mounted on said sleeve 18 below said bearing 19. Mounted on said sleeve and resting upon the flange 21 thereof is a collar 25. Similarly disposed on the sleeve 18 and resting upon the upper end of said collar 25 is a sleeve 26 which carries the vane 27. Said sleeve 26 is provided in diametrically opposite points on its inner circumferential face with helical grooves 28, the pitch of which is at an angle of 45 degrees to the vertical plane of the axis and extends through an arc of substantially 90 degrees. At each end said groove 28 is provided with a vertical extension 29. On said sleeve 18 at diametrically opposite points, I provide pins 30 which are adapted to travel in said grooves 28 and their extensions 29 so that by raising said sleeve 26 relatively to the sleeve 18 said pins 30 will pass from the upper vertical extensions 29 into the grooves 28 and finally into the lower extensions 29. During the travel of said pins from the first named to the last named position relative rotary movement will be imparted to said sleeves 18 and 26 through an arc of substantially ninety degrees. To effect such relative rotary movement I provide on said flange 22 of the bearing 19, at diametrically opposite points, projections 31, to each of which toggle links 32 are pivotally secured at one end, the other end of said links being pivotally connected by means of pins 33 with the ends of toggle links 34 which are in turn pivotally connected at their other ends with pins 35 on said collar 25. Pivotally secured at the free ends of its arms to said pins 33 is a U-shaped member 36 provided at its middle portion with a projection 37 to which the free end of the arm 38 of a bell crank lever 39 is secured, said lever 39 being pivotally supported at its elbow between lugs 40 disposed upon said spider 30. The free end of the long arm of said bell crank lever has a rope or cable 41 depending therefrom and by drawing the latter down to depress said long arm of said bell crank lever the said U-shaped member 36 will be drawn forward, and by such action the relative positions of said toggle links 32 and 34 will be changed so that the latter will extend substantially vertically relatively to each other and the collar 25 will thus be raised sufficiently to raise said sleeve 26 to the height necessary to move the pin 30 from the upper extension 29 of the groove 28 into the lower extension thereof. This movement will cause said vane 27 to assume the position shown in Fig. 6. Said vane will serve to maintain the guard plate 24 opposed over its entire area to the direction of the wind and thus prevent the latter from operating the wheel partly inclosed thereby.

While it is preferable that the wind wheel should revolve on a vertical axis, it will be understood that this is not essential and that the device will operate efficiently regardless of the position of its axis of rotation.

I claim as my invention:

1. In a wind-motor, a substantially cylindrical wind-wheel adapted to rotate on a vertical axis and comprising a shaft, a pair of circular plates carried thereby at different elevations, a plurality of trough-shaped wind-pressure members secured at their ends to said respective plates adjacent the peripheries thereof, the concave face of each opposing the convex face of the next adjacent of said members, and a trough-shaped spoke connecting each of said members between its ends with the said shaft.

2. In a wind-motor, a substantially cylindrical wind-wheel adapted to rotate on a vertical axis and comprising a shaft, a pair of circular plates carried thereby at different elevations, a plurality of trough-shaped wind-pressure members secured at their ends to said respective plates adjacent the peripheries thereof, the concave face of each opposing the convex face of the next adjacent of said members, a trough-shaped spoke connecting each of said members between its ends with the said shaft, said spokes connecting alternate members being disposed at respectively different elevations.

3. In a wind-motor, a substantially cylindrical wind-wheel adapted to rotate on a vertical axis and comprising a shaft, a pair of circular plates carried thereby at different elevations, a plurality of trough-shaped wind-pressure members secured at their ends to said respective plates adjacent the peripheries thereof, the concave face of each opposing the convex face of the next adjacent of said members, a trough-shaped spoke connecting each of said members between its ends with the said shaft, said spokes connecting alternate members being disposed at respectively different elevations, a segmental guard plate partly inclosing said wheel and rotatable relatively thereto on the same axis, and a vane rigidly connected with said plate and controlling the same.

4. In a wind-motor, a substantially cylindrical wind-wheel adapted to rotate on a vertical axis and comprising a shaft, a pair of circular plates carried thereby at different elevations, a plurality of trough-shaped wind-pressure members secured at their ends to said respective plates adjacent the peripheries thereof, the concave face of each opposing the convex face of the next adjacent of said members, a trough-shaped spoke connecting each of said members between its ends with the said shaft, said spokes connecting alternate members being disposed at respectively different elevations, and triangular plates secured on one edge to each of said circular plates and angularly disposed relatively to the planes thereof, the free edges thereof disposed in the direction of the concave faces of said members and forming wind-pressure pockets between the opposing faces of said circular and triangular plates.

5. In a wind-motor, a substantially cylindrical wind-wheel adapted to rotate on a vertical axis and comprising a shaft, a pair of circular plates carried thereby at different elevations, a plurality of trough-shaped wind-pressure members secured at their ends to said respective plates adjacent the peripheries thereof, the concave face of each opposing the convex face of the next adjacent of said members, a trough-shaped spoke connecting each of said members between its ends with the said shaft, said spokes connecting alternate members being disposed at respectively different elevations, triangular plates secured on one edge to each of said circular plates and angularly disposed relatively to the planes thereof, the free edges thereof disposed in the direction of the concave faces of said members and forming wind-pressure pockets between the opposing faces of said circular and triangular plates, a segmental guard plate partly inclosing said wheel and rotatable relatively thereto on the same axis, and a vane rigidly connected with said plate and controlling the same.

In testimony whereof I have signed my name in presence of two subscribing witnesses.

JOHN SCHEUBECK.

Witnesses:
RUDOLPH WM. LOTZ,
M. M. BOYLE.